United States Patent [19]

Phillips

[11] Patent Number: 4,714,386

[45] Date of Patent: Dec. 22, 1987

[54] LOCKSMITHS' METHOD AND APPARATUS FOR COMBINATION SAFES

[75] Inventor: Peter J. Phillips, Redundo Beach, Calif.

[73] Assignee: Lockmasters, Inc., Nicholasville, Ky.

[21] Appl. No.: 4,155

[22] Filed: Jan. 20, 1987

Related U.S. Application Data

[62] Division of Ser. No. 832,169, Feb. 20, 1986, Pat. No. 4,662,201.

[51] Int. Cl.[4] ........................ B23B 47/28; E05B 63/00

[52] U.S. Cl. .................................... 408/72 R; 70/465; 408/115 R

[58] Field of Search ................. 29/426.4, 804; 70/465; 408/72 R, 72 B, 84, 115 R, 115 B, 103, 104

[56] References Cited

U.S. PATENT DOCUMENTS

| | | | |
|---|---|---|---|
| 257,626 | 5/1882 | Thurman . | |
| 3,677,655 | 7/1972 | Ratteree et al. | 408/72 R X |
| 3,871,197 | 3/1975 | Wavgiser et al. | 70/63 |
| 4,307,983 | 12/1981 | Blough et al. | 408/72 B |
| 4,447,176 | 5/1984 | Blough et al. | 408/72 R |
| 4,533,284 | 8/1985 | Agius et al. | 408/115 R X |

*Primary Examiner*—Gil Weidenfeld
*Assistant Examiner*—Steven C. Bishop
*Attorney, Agent, or Firm*—King and Schickli

[57] ABSTRACT

A method and apparatus for use by a locksmith for ascertaining the combination of a locked safe of a known type without destruction of the lock or safe includes the location of a position beneath the dial or dial ring of the safe at which a repairable access hole can be drilled into the lock at a known angular position relative to the lock's fence and coaxially with an unoccupied, cylindrical region generally normal and tangential to the tumbler wheels of the lock, through which a probe may be inserted to sense the outer circumference of the wheels and to detect the alignment of the gate in each wheel with the probe by manipulation of the spindle of the lock in a predetermined, sequential order. From the known angular position of the axis hole and the angular position of the spindle required to align the gates in the wheels with the probe, the combination of the lock can be computed. The apparatus includes a drill fixture having a plurality of index holes which are coincident with the required access hole position of a number of commercially-available locks, and a unique probe and a derrick for mounting a drill motor and bit to the fixture. The method and apparatus can be alternatively used to drill the fence from the lock's fence lever in the event of lock malfunction.

8 Claims, 16 Drawing Figures

Fig. 7.
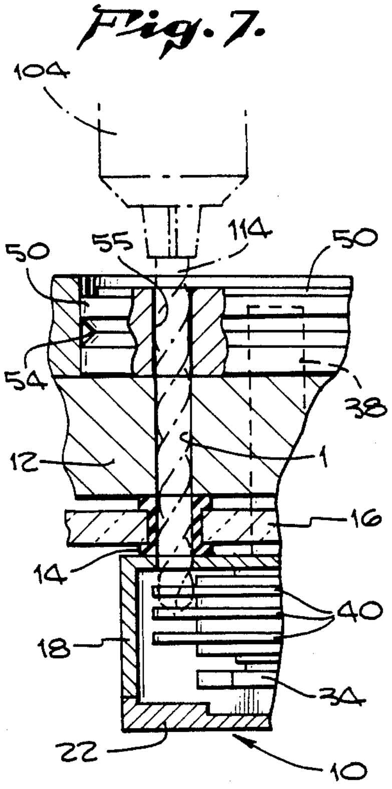
Fig. 9.
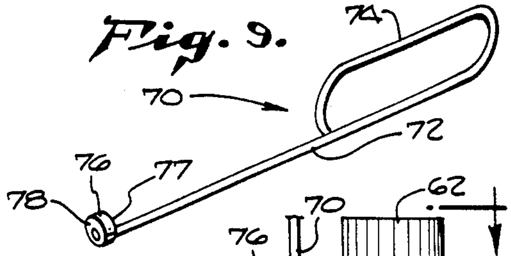
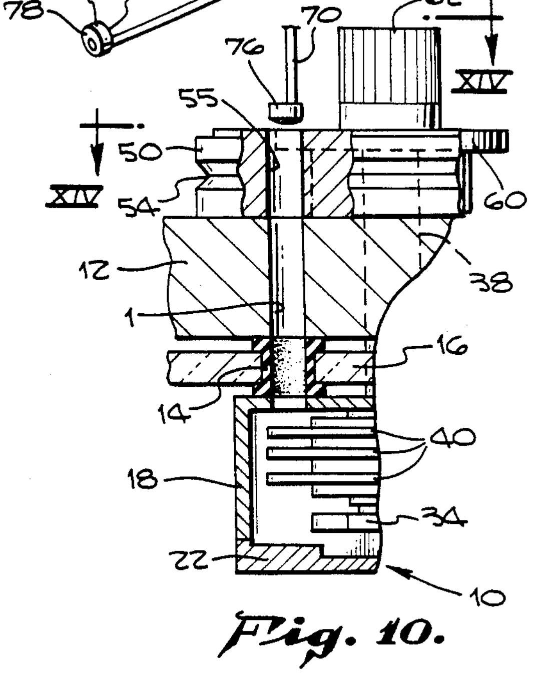
Fig. 10.
Fig. 8.
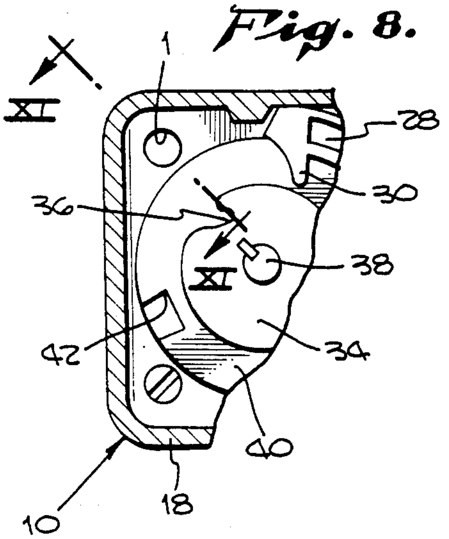
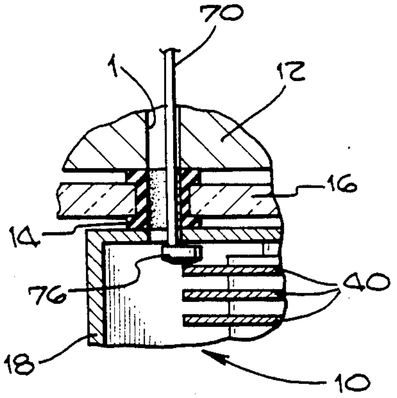
Fig. 11.

LOCKSMITHS' METHOD AND APPARATUS FOR COMBINATION SAFES

This application is a division of application Ser. No. 832,169, filed Feb. 20, 1986, now U.S. Pat. No. 4,662,201.

BACKGROUND OF THE INVENTION

1. Field of the Invention

In general, this invention pertains to locksmiths' tools and methods, and in particular, to a method and apparatus for determining the combination of a locked safe of a particular, known type without the destruction of the lock or safe.

2. Description of the Related Art

A conventional combination lock typically comprises a plurality of tumbler wheels which are coaxially journaled on a rotating spindle which projects outwardly from the lock and mounts a lock dial having a plurality of calibration marks thereon opposed to a dial ring having a index mark opposed to the calibrations. The spindle is rotatably coupled to the tumbler wheels through a lost-motion connection such that each of the tumbler wheels may be driven upon a predetermined rotation of the spindle. Each of the tumbler wheels and a drive cam mounted coaxially with the wheels are provided with a circumferential gate at a selected radial position.

A fence lever pivotally connected at one end to a sliding bolt has a nose part at the opposite end which is designed to reside on the drive cam periphery and a fence projecting laterally in overlying relation with the peripheries of the tumbler wheels. When the tumbler wheel gates are out of alignment with the fence, contact of the fence with the outer periphery of the tumbler wheels prevents the nose of the fence lever from engaging in the gate of the drive cam, and it is only when the tumbler wheels have been aligned by their manipulation in a predetermined, sequential order of angular displacements that the fence lever will engage the gates and permit the nose part to engage the drive cam, thereby permitting the bolt to be drawn by a rotation of the spindle.

A variation on such a lock is discussed in U.S. Pat No. 3,968,667 to Gartner, et al.

It occasionally falls to the locksmith to open a locked safe mounting such a lock when either the combination is unavailable or in the case of lock malfunction. The safe may be opened either by manipulation or by forced entry. The advantage to manipulation is that it does not damage the safe or its contents, either of which may be very valuable. However, the disadvantage is that the technique is not easy to master. In attempting to drill the lock open, exact calculations are required to determine the correct drilling location. Additionally, a variety of scopes, templates, lights and other tools are frequently necessary. Finally, the opening precedure usually boils down to a tedious, time-consuming, "hit-or-miss"proposition, as the locksmith attempts to manipulate the gates of the wheels into simultaneous alignment with the fence of the lock.

SUMMARY OF THE INVENTION

It is therefore an object of the present invention to provide a method for use by locksmiths in opening combination safes of a known type which permits the combination of the lock to be ascertained reliably, repeatably, and on the first try through manipulation of the lock through a single access hole located beneath the dial or dial ring of the lock, such that the hole may be repaired without adversely affecting the safe's function or cosmetic appearance.

It is yet another object of the present invention to provide an apparatus for use in conjunction with the method for locating and drilling the access hole accurately, reliably, and without damage to the lock or the safe in an embodiment which is portable, inexpensive and easy to use by the locksmith.

These and other objects and advantages of the present invention are preferably accomplished in a method which provides for:

- identifying the type and model of the lock;
- deriving from the lock's identity the sequence and direction of rotation of each of the lock's tumbler wheels corresponding to the pre-determined, sequential order of angular displacements necessary to align the gates with the fence for that particular kind of lock;
- deriving from the lock's identity at least one position on the door of the safe for drilling an access hole therethrough and into the lock, the position being located radially within the circumference of the dial ring, at a known angular position relative to the fence, and coaxial with an unoccupied, cylindrical region lying between the wheels and the walls of the lock's housing, the cylindrical region being both generally normal and tangential to the circumference of the wheels and having a diameter about the same as the width of the gates in the tumbler wheels;
- removing the dial and dial ring from the door to expose the access hole position;
- drilling the access hole at the position, through the door, into the lock, coaxially with the unoccupied region, the access hole having a diameter the same or smaller than the cylindrical region;
- rotating the spindle of the lock through a plurality of revolutions sufficient to clear the wheels of the previously-set combinations;
- inserting one end of a probe through the access hole, into the region within the lock, the probe having an eccentric, cylindrical tip with a diameter substantially the same as the width of the gates, a thickness substantially the same as the thickness of one of the wheels, and a cylindrical inner and outer face located at either end;
- manipulating the probe coaxially within the region until the eccentric tip is radially-aligned toward the axis of the spindle and in contact with the circumference of the wheel to be rotated first in order;
- rotating the first wheel slowly with the spindle in the required direction until the probe tip engages the gate of the wheel;
- noting the angular position of the spindle relative to the index of the safe when the probe tip is engaged in the gate;
- computing the combination of the first wheel from the noted angular position of the spindle and the known angular position of the access hole; and
- repeating sequentially the four steps immediately-preceding for each remaining wheel within the lock in the derived order, whereby the combination of the lock is ascertained.

The apparatus for practicing the method comprises: the probe;

fixture means for locating and drilling the access hole precisely on the door, including means for mounting the fixture means to the door such that the access hole is precisely located relative to the spindle and the fence; and means for rotating the spindle when the dial has been moved, further including means for measuring the angular position of the spindle relative to the lock's index when the dial ring has been removed.

In a narrower embodiment of the apparatus, derrick means are disclosed for mounting a drill and drill motor to the fixture such that the drill may be accurately positioned over the access hole location, and further includes means for advancing the drill into the fixture and lock in a controlled, mechanically-advantageous manner.

A more complete understanding of the invention may be had by skilled practitioners from a consideration of the following description of the preferred embodiments, when read in conjunction with the drawings, wherein:

BRIEF DESCRIPTION OF THE DRAWINGS

FIG. 7 illustrates the access hole of the present invention being drilled in a position corresponding to one of the mounting bosses of the safe's lock;

FIG. 8 is a partial sectional view looking into the rear of the lock illustrated in the previous figure, showing the drilled-out access hole;

FIG. 9. is a perspective view of a preferred embodiment of the probe of the present invention;

FIG. 10 is a partial sectional view of the apparatus of the present invention showing the tip of the probe about to be inserted into the coaxial bores of the access hole through the fixture, safe door, lock mounting boss and into the lock;

FIG. 11 is a sectional view through the access hole, as revealed by the section XI—XI taken in FIG. 8, showing the eccentric tip of the probe in contact with the circumference of the first tumbler wheel of the lock;

DESCRIPTION OF THE PREFERRED EMBODIMENTS

Figures 1, 2, 3, 4:
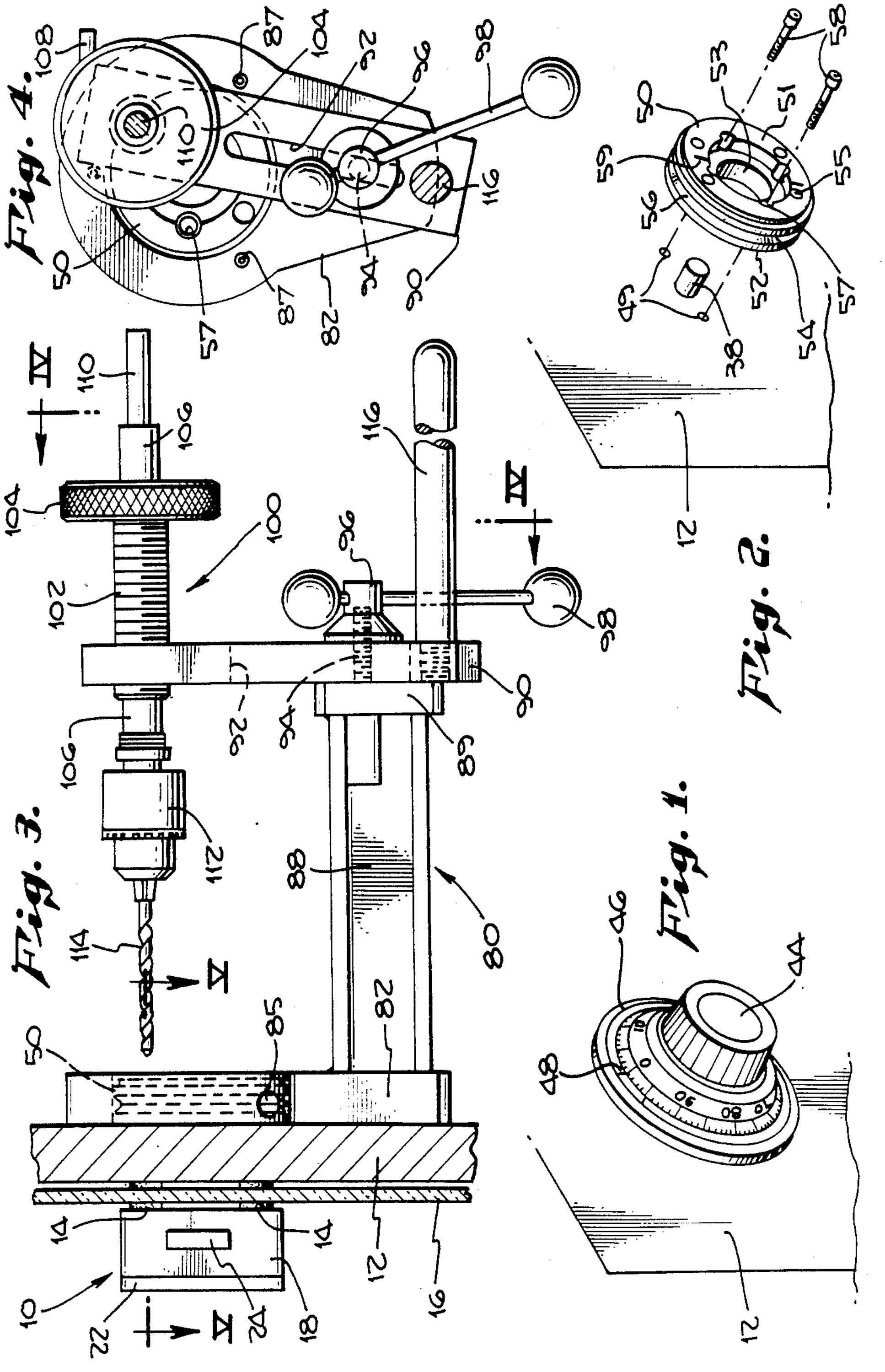
FIG. 1 is a perspective view of a dial and dial ring of a combination lock mounted on the door of a safe.
FIG. 2 shows the safe door of FIG. 1 with the dial and dial ring removed and replaced by the drill fixture of the present invention shown being mounted by a pair of fasteners into the dial ring's mounting holes.
FIG. 3 is a partial sectional view through the side of the apparatus of the present invention.
FIG. 4 is a view looking down into the top of the apparatus of the present invention, as revealed by the section IV—IV taken in FIG. 3.

FIG. 3 is a side view of an exemplary preferred embodiment of the apparatus of the present invention intended for use in conjunction with a safe having a combination lock 10 mounted on the inside of the safe's door 12. Typically, lock 10 is mounted to door 12 by way of mounting bosses 14, which may be contained in a layer of hardplate or glass relocker 16 interposed between lock 10 and door 12.

Figure 5:
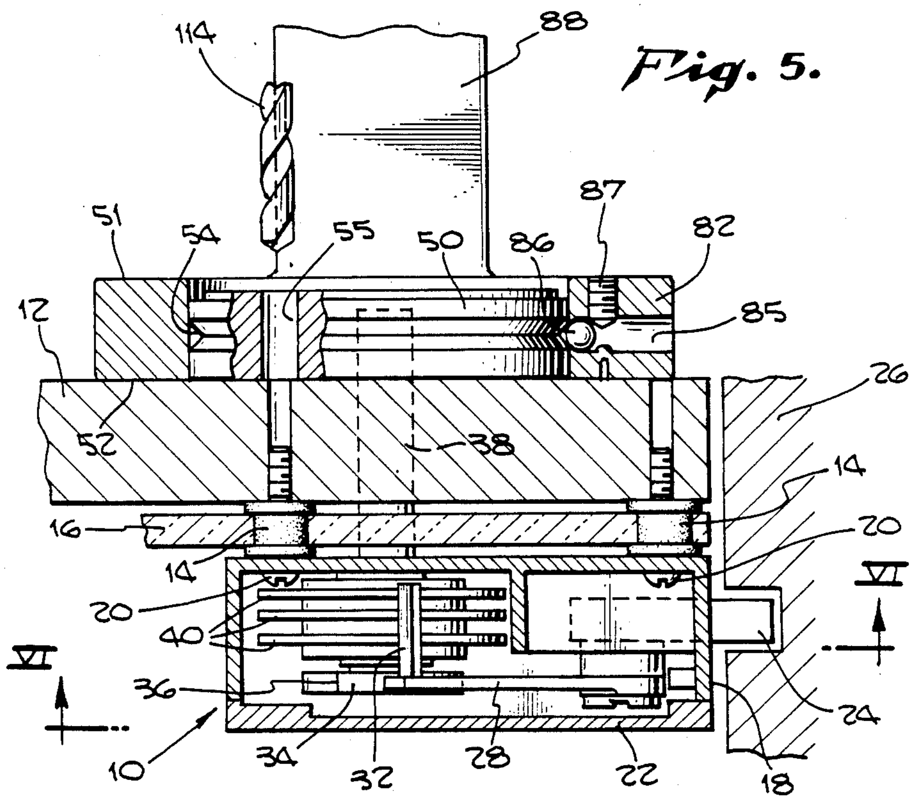
FIG. 5 is a partial sectional view into the side of the apparatus of the present invention, as revealed by the section V—V in FIG. 3.
Figure 6:
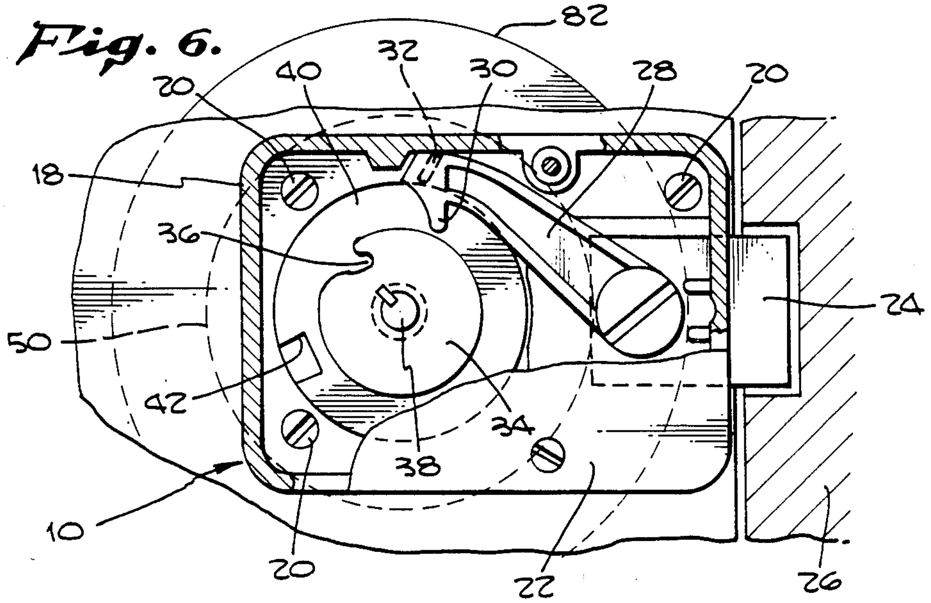
FIG. 6 is a partial sectional view into the rear of the lock of the safe, as revealed by the section VI—VI taken in FIG. 5.

Lock 10 includes (see FIG. 5) a walled housing 18 and is mounted through housing 18 by means of a plurality of mounting fasteners 20 which thread into threaded apertures contained in door 12. The contents of housing 18 are accessed from the rear of lock 10 by means of access cover 22. Contained therein is a locking bolt 24, slidably retained within housing 18. Bolt 24 engages a recess within door frame 26 to lock door 12 in place and is withdrawn from the recess to unlock door 12 by means of a fence lever 28.

Fence lever 28 is pivotally attached to bolt 24 at one end and contains a nose part 30 at the other end. A fence 32 projects laterally from the rear face of fence lever 28 and both may be biased toward the centerline of lock 10 by either a spring or gravity.

A cam wheel 34 containing a gate 36 is mounted to a spindle 38 which projects forward from lock 10 to extend through door 12 and rearwardly into lock housing 18. Mounted coaxially on spindle 38 are a plurality of tumbler wheels 40, each containing a gate 42 in its outer circumference. Tumbler wheels 40 are rotationally-coupled to spindle 38 by means of a lost-motion connection such that each of the tumbler wheels 40 may be driven in predetermined rotations of spindle 38. Fence 32 overides tumbler wheels 40 such that, only when gates 42 are aligned radially below fence 32 and fence lever 28 pivots sufficiently toward spindle 38, will nose part 30 engage the gate 36 in cam wheel 34 to withdraw bolt 24 by subsequent rotation of spindle 38.

Exterior of door 12, lock 10 in comprises (see Fig. 1) a dial 44 which mounts to spindle 38 and contains a plurality of numbered, evenly-spaced radial divisions, along with a dial ring 46 having at least one index mark 48 radially-opposed to the divisions on dial 44 and mounted to the front of door 12 by a plurality of fasteners passing into threaded apertures 49 contained in door 12. By rotating dial 40 through a predetermined, sequential order of angular rotations relative to index 48 corresponding to the "combination" of the lock, alignment of gate 42 with fence 32 is accomplished within lock 10.

It frequently devolves upon the locksmith to open a locked safe containing a lock of the type heretofore described for which the combination has been lost or forgotten by the safe's owner. This can be accomplished by either destruction of the lock and/or door or, preferably, by ascertaining the combination of the lock from outside the safe by accessing tumbler wheels 40 in a non-destructive fashion.

It has been discovered that, for a majority of the makes and models of locks of the type previously described and typically encountered by the locksmith, this may be accomplished by drilling an access hole beneath the dial of the safe, through the door and into the lock, followed by a sequential set of steps in which the tumbler wheels are probed through the access hole while being manipulated into alignment with the access hole by the spindle, followed by the computation of the combination of the lock from the known position of the access hole relative to the index of the lock. When the combination is thus known, the access hole may then be plugged or welded shut without adversely effecting the function or appearance of the safe.

In the case of some locks (see FIGS. 7 and 8), an access hole 1 can be positioned such that it coincides with one of the lock's mounting fasteners 20 so that the drilling of access hole 1 results in minimal injury to lock 10.

Thus, the first step in the preferred method of the present invention is to identify the make and model of the lock 10 which is to be opened. From this information and the manufacturer's specification, the direction (hand) of the lock (left-hand, right-hand, v-up or v-down), the number of tumblers and their sequential order of manipulation, the angular position of the fence relative to the index, and the optimum location for drilling the access hole can then be derived.

The dial 44 and dial ring 46 are then removed from the door 12 to expose the derived position on door 12 at which access hole 1 is to be drilled. The latter is coaxial with an unoccupied, cylindrical region lying between the tumbler wheels 40 and the walls of the lock housing 18 and generally normal and tangential to wheels 40 and having a diameter the same or greater than the width of the gates 42.

When removing the safe's dial 44 and dial ring 46, it must be borne in mind that there are many different styles of combination lock dials. Most are press-fit onto spindle 38. Dial removal can be accomplished using a screwdriver, a slide hammer or the drill-and-tap method. The drill-and-tap method requires drilling dial 44 directly above spindle 38, tapping the hole, and screwing down a bolt to lift off dial 44. Most dial rings 46 are secured to door 12 using Phillips-head screws.

Access hole 1 is then drilled through door 12 and into the cylindrical region within lock 10. The method of the present invention contemplates that access hole 1 be located pricisely, and accordingly, means for locating access hole 1 and for guiding a drill bit in the drilling of access hole 1 are required. Such means are illustrated in FIG. 2 and comprise an annular shaped drill fixture 50 made of a hard material, preferably hardened tool steel, which has planar, parallel front and rear surfaces 51 and 52, an inner diameter 53 sized to pass spindle 38 coaxially therethrough, and an outer diameter the same as, or slightly greater than, the diameter of the lock's dial ring 46, and containing a circumferential, vee-shaped groove 54.

Fixture 50 contains at least one drill guide hole 55 passing normally through the front and rear surfaces 51 and 52 and having a diameter which is substantially the same as the diameter of access hole 1 and located in fixture 50 at a radial position equal to the derived radial position of access hole 1 relative to the centerline of spindle 38. It is to be noted that a variety of lock makes and models may be accommodated in a single fixture 50 by the provision of a plurality of drill guide holes 55, each located in accordance with a known position for the optimal access hole for the particular make and model of lock being worked on, and coded on fixture 50 for the locksmith's convenience.

Figure 16:
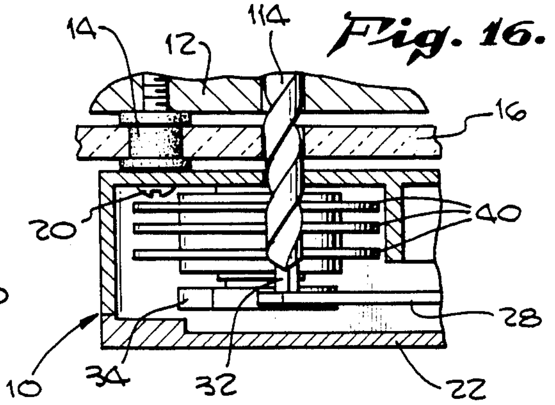
FIG. 16 is a partial sectional view through the lock showing the use of the method and apparatus of the present invention for drilling the fence of the lock.

The preferred fixture 50 illustrated (see FIGS. 2 and 14) is also provided with at least one fence-drilling guide hole 56 for use by the locksmith in those cases when, for one reason or another, the lock is inoperative and cannot be manipulated. In this case, it may be necessary to drill away fence 32 of the lock 10 in order to open the safe, as illustrated in FIG. 16, and the provision of fence-drilling hole 56 in the fixture provides an accurate and convenient means for accomplishing this.

Exemplary drill fixture 50 is simultaneously positioned and mounted to safe door 12 by the provision of at least two mounting holes which are made to coincide with the same mounting holes 49 utilized for mounting the safe's dial ring 46. A pair of cap screws 58 serves both accurately to position drill guide fixture 50 coaxially with spindle 38 and at an angular position on door 12 such that the appropriate drill guide hole 55 is positioned coaxially over the position for access hole 1.

Fixture 50 contains at least 1 temporary "replacement index mark" 59 for use by the locksmith in lieu of the safe's index mark 48, which is unavailable by reason of the previous removal of dial ring 46. For some models of combination lock 10, index mark 48 may be positioned directly over one of the fixture's mounting holes 57. In this case, replacement index mark 59 may be rotated slightly offset on drill fixture 50 from the actual position of the safe's index mark 48 to avoid the hole and the amount of this offset must be taken into account in computing the safe's combination.

Figure 14:
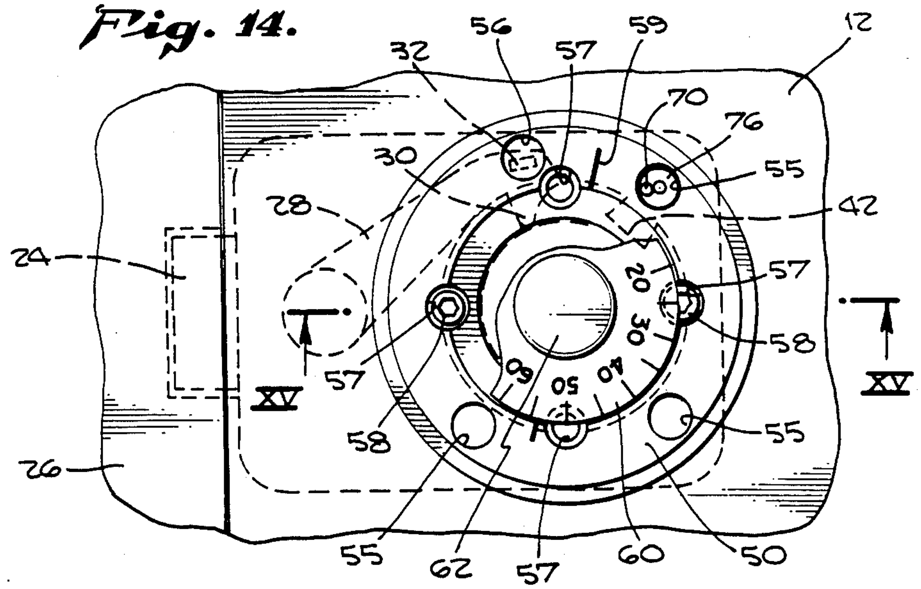
FIG. 14 is a partial front view of the apparatus of the present invention, as revealed by the section XIV—XIV taken in FIG. 10, showing the replacement dial, the face of the drill fixture, the eccentric probe tip shown rotated away from the circumference of the tumbler wheels, and with the fence lever bolt and lock housing shown in dotted outline.
Figure 12:
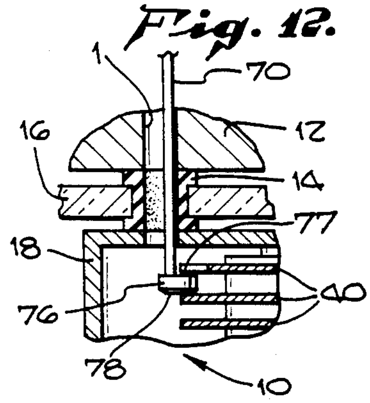
FIG. 12 is similar to FIG. 11, except that the first tumbler wheel has been aligned with the access hole positon and the eccentric probe tip has been moved to contact the circumference of the second tumbler wheel.
Figure 15:
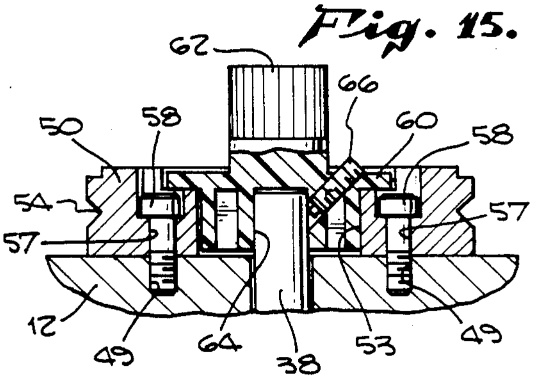
FIG. 15 is a partial sectional view through the side of the fixture and replacement dial of the present invention, showing the mounting of the replacement dial to the spindle of the lock, as revealed by the section XV—XV taken in FIG. 14.
Figure 13:
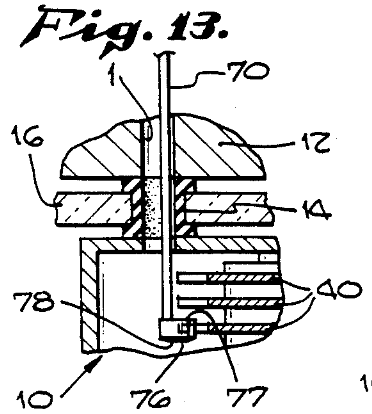
FIG. 13 illustrates the probe immediately after all three gates in the tumbler wheels have been aligned with the access hole position.

For similar reasons, a temporary "replacement dial" 60 is required for manipulating spindle 58 and measuring its angular displacements relative to the replacement index mark 59 once dial 44 has been removed from the safe for drilling. Such a replacement dial 60 is illustrated in FIGS. 10, 14 and 15. In the preferred embodiment, replacement dial 60 is an inexpensive, injection-molded plastic piece having a knurled knob 62 projecting outwardly to grasp with the fingers for rotating spindle 38 during manipulation. Replacement dial 60 contains a plurality of numbered, evenly-spaced, radial divisions on the face of its circumference which coincide with those of the safe dial 44 being replaced. Replacement dial 60 is sized to fit within the inner diameter of fixture 50 such that its divisions oppose replacement index mark 59 for accurate and convenient measurement of angular displacements of spindle 38.

In order to accommodate the wide variety of locks on the market today, it is contemplated that the apparatus of the present invention will contain a plurality of replacement dials 60, each containing a differently-sized spindle-mounting hole 64. In particular, it is anticipated that four replacement dials 60, having respective spindle-mounting hole 64 sizes of ¼", 5/16", ⅜" and 0.330" diameters should suffice to adapt to almost any combination lock of the type discussed herein on the market today. Replacement dial 60 mounts to spindle 38 by means of an angled set screw 66 which is tightened after dial 60 has been installed on spindle 38 and zeroed using the contact points of lock 10 as a guide.

Once drill fixture 50 has been mounted to safe door 12, the next step of the preferred method, i.e., the drilling of the access hole 1, may be commenced. When penetrating hard plate, drilling straight-in is recommended, as it is much more difficult to gain entry using an angled approach. The drill fixture 50 of the present invention is well suited for this purpose, and so long as the proper drill bit size is used, drill fixture 50 will ensure that access hole 1 is being drilled straight. It must be remembered that a nominal ¼" carbide drill can vary in size from 0.250" up to 0.272". For this reason, it is very important to check that the bit will slide through the guide hole 55 which is to be used before drilling begins.

In general, it is best to use high-quality, high speed twist drills to penetrate the mild outer steel of door 12. If hardplate is contacted after the mild steel has been drilled through, the hardplate should be drilled using a high quality carbide-tipped drill bit. Much of the hardplate being used in safes today is case-hardened to a Rockwell value of 57 to 63. Case-hardening means that only the outer surfaces are hardened—the middle portion of the hardplate is soft and may be easily drilled.

A hand-held drill bit and holder may be used if a constant and steady pressure can be maintained through the hardplate. Caution must be exercised when breaking through the back of the hardplate and, once the drill bit has entered the inside of the case of lock 12, drilling must cease to prevent injury to lock 10.

Once access hole 1 has been drilled, the manipulation procedure may be commenced. However, before this occurs, lock 10 should be cleared of any previously-set combinations by rotating spindle 38 through a plurality of revolutions in accordance with the usual procedure for clearing the particular type and model of lock 10 at hand.

The next step of the preferred method entails the insertion of a probe suitable for contacting the circumference of the tumbler wheel 40 and detecting when the gates 42 are in alignment with the access hole 1. The preferred apparatus for accomplishing this is the probe 70 illustrated in FIG. 9.

Probe 70 comprises an elongated body 72 having a cross-sectional area thinner than the diameter of access hole 1, with a handle 74 located at one end for grasping and a cylindrical probe tip 76 attached eccentrally at the other end having a diameter substantially the same as the width of the gates 42, a thickness generally the same as the thickness of one of tumbler wheels 40 and cylindrical inner and outer contacting faces 77 and 78, respectively, located at either end thereof. Probe tip 76 is attached to probe 70 at a known angular orientation relative to handle 74 such that probe tip 76 can be manipulated into a known orientation relative to the circumference of the tumbler wheels 40 with handle 74 while probe tip 76 is inside of lock 10, and hence, out of view of the user.

The next step of the preferred method comprises manipulating probe 70 within the cylindrical region until probe tip 76 is radially aligned towards the axis of the spindle 38 and in contact with the circumference of the tumbler wheel 40 which has been derived to be sequentially first to be manipulated in the predetermined order necessary to open the particular make and model of lock 10 being operated upon. In this regard, it is to be noted that probe tip 76 is adapted for contacting the circumference of tumbler wheel 40 with either the side of probe 76 or the inner or outer face 77 or 78 located at either end. The wheels of a combination lock whose wheel post is part of the case are read in order from front to back, i.e., the first wheel to be read is the tumbler wheel 40 closest to the front of lock 10, with succeeding wheels 40 read in order sequentially from front to rear of lock 10. Thus, for locks of this type, probe 70 is pressed forward coaxially within access hole 1 until outer face 78 is in contact with an annular, circumferential area containing the gate of the first-encountered tumbler wheel 40. Probe tip 76 is maintained in this contact with a slight axial force while the wheel 40 is slowly rotated with spindle 38 in the direction of rotation of the first wheel 40 which has been derived to correspond to the predetermined, sequential order for opening lock 10 until probe tip 76 falls into engagement with gate 42 of first tumbler wheel 40.

The angular position of spindle 38 relative to the replacement index 59 on drill fixture 50 is then noted, as read from replacement dial 60. From this measured angular position of spindle 38 and the known angular position of access hole 1 relative to the safe's index mark 48, the combination of the first tumbler wheel 40 is then easily computed.

Since probe tip 76 is now engaged within gate 42 of the first tumbler wheel 40, it may be eased forward axially within lock 10 until brought into the previously-described type of contact with the tumbler wheel 40 derived to be second in order of rotation and the previous steps repeated to ascertain the combination of the second, third, etc. wheels. When the combination for each of the tumbler wheels 40 has been computed, the combination of lock 10 will have been ascertained, and the safe opened.

When first practicing the steps of the present method, skilled practitioners may wish to repeat the procedure several times until the "feel" of the apparatus and method have been mastered and the combination numbers obtained are consistent. However, once the technique has been mastered, the combination of a safe having a lock of the type described herein can be determined in less than a minute after access hole 1 has been drilled.

In practicing the technique, skilled practitioners must strive to rotate replacement dial 60 slowly while maintaining a slight pressure on probe tip 76 against the tumbler wheel 40 which is being read and while maintaining probe tip 76 oriented angularly toward the axis of the wheel.

In some instances, e.g., Mosler combination locks, tumbler wheels 40 are read in axial order beginning with the wheel 40 farthest from the front of lock 10. For locks of this type, the procedure is substantially the same, except that contact between probe tip 76 and tumbler wheel 40 being read is either between the edges of the wheel and side of probe tip 76 or the rear faces of the wheels 40 and the inner face 77 of probe tip 76. In this case, an adapter (not illustrated) can be attached coaxially to outer face 78 of probe tip 76 which then serves to space probe tip 76 precisely at the depth of the particular wheel 40 being read when the other end of the spacer is brought into contact with the inner surface of cover 22 at the rear of lock 10. In this case, the rearmost tumbler wheel 40 is contacted on its edge by the side of probe tip 76 while maintaining a slight rotational pressure on probe tip 76 toward the access of spindle 38 and a slight axial force by the adapter on probe tip 76 against cover 22 while reading the combination of wheel 40. After the combination of the first wheel has been read, the probe 70 must be removed to replace the adapter with a longer one without rotating replacement dial 60. In this manner, the combination of each of the tumbler wheels 40 may be read in sequential order from rear to front of lock 10.

In the case of Federal Combination Locks, the wheel pack is mounted on the cover of the lock and it is necessary to begin with the wheel 40 farthest from the drive cam 34. In this case, probe tip 76 is inserted into the lock until outer face 78 of probe tip 76 contacts lock cover 22 directly. Probe tip 76 is then slid against the rearmost wheel 40 while maintaining outer face 78 in contact with lock cover 22 until the side of probe tip 76 contacts the edge of the rearmost wheel 40. This is the correct position for reading the first wheel 40 in this type of lock. When the combination of the first wheel has been obtained, probe 70 is pulled axially toward the front of lock 10 until inner face 77 of probe tip 76 contacts the annular, circumferential region containing its gate 42 on the rear face of the next-in-order tumbler wheel 40 and its combination and those of the remaining wheels are then sequentially read as described above.

In some cases, e.g., when lock 10 is inoperative, it may be necessary to drill the lock's fence 32. To accommodate this procedure, the drill fixture 50 of the present invention provides at least one drill guide hole 56 which is positioned coaxially with the fence 32 of a variety of combination locks. In this case, the bit of the drill is positioned in the appropriate fence-drilling guide hole 56 (See FIG. 14) and the door 12 is drilled through as above. However, before drilling fence 32, it is necessary to make sure that nose part 30 of fence lever 28 is riding above drive cam 34 and not in its gateway 36. This assures that fence 32 is in the proper position to be drilled. A flat-bottomed, high-speed drill bit should be used to drill out fence lever 32. Drilling should be accomplished slowly with gentle and constant pressure on the bit. Once fence 32 has been drilled away, replacement dial 60 is simply rotated in the appropriate direction to open lock 10.

Skilled practitioners will recognize that, whether drilling an access hole 1 or the fence 32, either procedure will be significantly aided in terms of accuracy and ease if means can be provided to position and support a drill bit and motor accurately above the appropriate guide hole within drill fixture 50 and if means for accurately controlling the advance of the bit into the safe are included. The exemplary preferred embodiment of the present invention contemplates that this may be achieved through the derrick means 80 illustrated best in FIGS. 3 and 4.

Derrick means 80 comprises a base 82 shaped in the form of an annulus, having an inner diameter sized to fit closely about the outer diameter of drill fixture 50. Base 82 is clamped concentrically about drill fixture 50 by means of the arrangement illustrated in FIG. 5. This clamping means includes a plurality of radial holes 85, each of which contains a frusto-conical inner portion opening convergently toward drill fixture 50, and sized to radially-captivate one of a plurality of steel balls 86 therein such that a portion of the ball 86 can protrude radially-inward from the inner diameter of the base 82. Base 82 further contains a plurality of threaded holes passing normally through the upper surface of base 82 to intersect one of ball-retaining holes 85 such that the centerlines of each threaded hole intersects that of one of the ball-retaining holes 85. A threaded fastener 87 having a conical-shaped tip is then threaded into each of the threaded holes such that ball 86 is radially-retained within base 82 between the conical portion of fastener 87 and the frusto-conical inner portion of ball-retaining hole 85.

When base 82 is then placed over drill fixture 50, and threaded fasteners 87 tightened inwardly, their conical tips force balls 86 outwardly from base 82 and into the v-shaped groove 54 on the outer circumference of drill fixture 50, and by further tightening thereof, cause base 82 to be securely and rigidly clamped concentrically about drill fixture 50.

Derrick means 80 further includes an elongated, vertical stand member 88 attached at its lower end to base 82 and projecting upwardly to terminate in an upper end 89 which is generally parallel with base 82, and which contain a vertical, threaded hole passing downwardly therethrough.

A positioning bar 90 is slidably-disposed on upper end 89 of stand member 88 to move both radially and angularly in a plane generally parallel with the plane of fixture 50 relative to the threaded hole in upper surface 89. Positioning bar 90 contains a slotted opening 92 between its two ends through which passes a threaded shaft 94 which, in turn, is capped by a clamping part 96 mounting a handle 98. In use, positioning bar 90 is adjusted such that the centerline of an arbor assembly 100 mounted in a threaded hole in one end of positioning bar 90 may be positioned accurately over any point on outer surface 51 of drill fixture 50. Positioning bar 90, and hence arbor assembly 100, may then be clamped rigidly in that position by tightening of handle 98.

Arbor assembly 100 includes an externally-threaded, first cylindrical sleeve 102 having a knurled handle 104 at one end for rotating first sleeve 102 by hand into the threaded hole contained in positioning bar 90. A second cylindrical sleeve 106 is slidably-retained coaxially within the first sleeve 102 to permit translation of second sleeve 106 toward and away from fixture 50.

In the exemplary embodiment illustrated, handle 104 contains a cylindrical bore passing transversely through its walls such that it intersects first and second sleeves 102 and 106 along a line perpendicular to both sleeves to intersect the outer surface of inner sleeve 106 and the inner surface of outer sleeve 102 simultaneously to form a pair of opposed, transverse, semi-cylindrical scallops in each of their surfaces. Additionally, inner sleeve 106 contains a plurality of identical, transverse, semi-cylindrical scallops spaced along its length parallel to the first-mentioned scallop therein such that when inner sleeve 106 is translated toward or away from fixture 50, one of the plurality of scallops in its outer surface opposes the one in the inner surface of outer sleeve 102. A cylindrical push-pin 108 is slidably retained within the cylindrical bore through handle 104 and is movable between first and second positions within outer sleeve 102. Push-pin 108 has a reduced diameter along a portion of its length such that, in the first position of push-pin 108, the pin engages one of the semi-cylindrical scallops in second sleeve 106 to lock movement of that sleeve relative to first sleeve 102, and when in the second position, the reduced diameter of push-pin 108 clears the semi-cylindrical scallops in inner sleeve 106 such that inner sleeve 106 may be quickly adjusted up or down above fixture 50 without the necessity for laborious turning of handle 104.

Arbor assembly 100 further includes a shaft 110 rotatably-retained coaxially within second sleeve 106. The upper end of shaft 110 is adapted for coupling to a drill motor and the lower end extends below the second sleeve 106 and mounts chucking means 112 to accommodate a variety of sizes of drill bit 114.

The other end of positioning bar 90 mounts a vertical mounting rod 116 which extends upwardly from positioning bar 90 and is used to mount the drill motor by means of one or more slidable clamps (not illustrated) such that the drill motor may move vertically with arbor assembly 100 when drill bit 114 is advanced toward fixture 50.

In the exemplary embodiment illustrated outer sleeve 102 is threaded with a relatively fine, single-pitch thread, such that drill bit 114 may be advanced extremely forcefully into the material being drilled by use of only slight exertion of hand torque on handle 104. Thus, drill bit 114 and may be quickly positioned over the appropriate location on drill fixture 50 by use of handle 98, may be quickly inserted into the appropriate drill guide hole in fixture 50 by use of the quick-lock feature of push-pin 108, yet an extremely precise and forceful control is obtained over the advance of drill bit 114 into the material of the safe and lock through the use of only slight hand forces on handle 104.

The embodiments of the method and apparatus of the present invention are capable of accomodating a wide variety of combination locks by a slight modification of one of the steps or elements of the apparatus, depending upon the application at hand. Accordingly, the scope and spirit of the present invention should be limited only by the claims appended hereto.

I claim:

1. An apparatus for locating and drilling an access hole through the door of a safe and into a combination lock mounted on the inside thereof within the area of the lock's dial ring at a given position relative to the spindle of the lock using a drill motor and bit, comprising:

an annular-shaped drill fixture made of a hard material, said fixture having generally planar, parallel front and rear surfaces, an inner diameter sized to pass said spindle coaxially therethrough, an outer diameter the same as, or greater than, the diameter of said dial ring, and at least one drill guide hole therethrough normal to said front and rear surfaces, said guide hole having substantially the same diameter as said access hole and located in said fixture at a radial position equal to the radial position of said access hole relative to said spindle;

means for mounting said fixture to said door coaxially with said spindle at an angular position on said door such that said drill guide hole is positioned coaxially over said access hole position; and derrick means for mounting said drill motor and bit to said drill fixture such that the axis of said bit is positioned generally orthogonal to said door, including means for adjustably-positioning said bit coaxially with said drill guide hole and for clamping said bit in said position, further including means for advancing said bit into said drill guide hole, through said door, and into said lock.

2. The apparatus of claim 1 wherein said means for mounting said fixture to said door futher comprises:

said dial ring having at least two mounting holes therethrough, and said fixture having at least one pair of mounting holes therethrough coincident with said dial ring mounting holes.

3. The apparatus of claim 1, further comprising:

said fixture having at least one additional drill guide hole therethrough normal to said front and rear surfaces and located in said fixture at a position coaxial with said fence when said fixture is mounted coaxially over said spindle on said door, for drilling said fence from said lock.

4. The apparatus of claim 3, wherein said means for mounting said fixture to said door further comprises:

said dial ring having at least two mounting holes therethrough, and said fixture having at least one pair of mounting holes therethrough coincident with said dial ring mounting holes.

5. The apparatus of claim 1, wherein said derrick means further comprises:

a base shaped in the form of an annulus, said annulus having an inner diameter sized to fit closely around said outer diameter of said fixture;

means for clamping said base in a radial direction coaxially to said fixture at any angular position of said base relative said fixture;

an elongated, vertical stand member having a lower end attached to said base and upper end disposed at a right angle to said member to lie generally parallel with said base, said upper end having a vertical, threaded hole passing therethrough;

a positioning bar for adjustably-positioning said drill motor and bit on said stand above said fixture, said bar being slidably-disposed on said upper end of said stand member in a plane generally parallel with the plane of said fixture, and having a first end, a second end, and an elongated slot in the center thereof between said ends;

a shaft passing through said elongated slot in said positioning bar, said shaft having a lower end threaded for advancing said shaft into said threaded hole in said upper end of said stand, and an upper end having means located thereat for tightening said upper end of said shaft against said positioning bar, for clamping said positioning bar to said stand;

a rod having one end mounted to, and extending upwardly from, said first end of said positioning bar for mounting said drill motor slidably along the length thereof; and arbor means for rotatably-mounting said bit in said second end of said positioning bar, including means for coupling said bit rotationally to said motor when said motor is mounted to said rod, further including means for advancing said bit into said drill guide hole, through said door, and into said lock.

6. The apparatus of claim 5, wherein said means for clamping said base to said fixture futher comprises:

a plurality of balls;

said base having a plurality of ball-retaining holes passing radially therethrough, each said hole having a cylindrical outer portion with a diameter slightly larger than one of said balls, and a frusto-conical inner portion opening convergently toward said fixture, to captivate one of said balls such that a portion of said ball may protrude inwardly of said base;

said base further containing a plurality of threaded holes passing therethrough normal to said ball-retaining holes such that the center lines of each said threaded hole intersects that of one of said ball-retaining holes; and a plurality of fasteners, each said fastener having a threaded portion to advance said fastener into one of said threaded holes, an upper end adapted for turning with a tool, and a lower end terminated in a conical portion for retaining said captive ball between said conical portion and said frusto-conical inner portion of said ball-retaining hole and for wedging said captive ball inwardly against said fixture when said fastener is advanced into said threaded hole, said fixture containing a V-shaped circumferential groove to receive said protruding portions of said balls when said balls are wedged inwardly with said fasteners.

7. The apparatus of claim 5, wherein said arbor means further comprises:

an externally-threaded, first cylindrical sleeve having handle means located at one end for rotating said first sleeve by hand, said positioning bar having a threaded hole passing orthogonally through said second end thereof to receive said first sleeve for advancing said first sleeve toward said fixture with mechanical advantage when said first sleeve is rotated by hand;

a second cylindrical sleeve slidably-retained coaxially within said first sleeve to translate toward said fixture;

means for quickly locking and unlocking said second sleeve within said first sleeve to permit said second sleeve to be quickly advanced toward that fixture by hand without rotation of said first sleeve;

a shaft rotatably-retained coaxially within said second sleeve, said shaft having an upper end extending above said second sleeve adapted for coupling to said drill motor and a lower end extending below said second sleeve, above said fixture; and means for chucking said bit coaxially to said shaft, located at said lower end of said shaft.

8. The apparatus of claim 7, wherein said means for quickly locking and unlocking said second sleeve further comprises:

said first and second sleeves having a cylindrical bore passing transversely through the walls of said sleeves along a line perpendicular to said sleeves to intersect both the outer surface of said inner sleeve and the inner surface of said outer sleeve simultaneously to form a pair of opposed, transverse, semi-cylindrical scallops in each of said surfaces;

said second sleeve having a plurality of said transverse semi-cylindrical scallops spaced along the length thereof parallel to said pair; and a cylindrical pin slidably-retained within said bore and movable between first and second positions within said first sleeve, said pin having a diameter slightly smaller that said bore such that, at said first position, said pin engages one of said semicylindrical scallops in said second sleeve to lock said second sleeve against movement against said first sleeve, said pin having a reduced diameter along a portion of the length thereof such that, at said second position, said pin sleeve, whereby said second sleeve is unlocked for movement within said first sleeve.

* * * * *